(12) United States Patent
Kunz et al.

(10) Patent No.: US 10,393,241 B2
(45) Date of Patent: Aug. 27, 2019

(54) CAMSHAFT, ESPECIALLY FOR MOTOR VEHICLE ENGINES

(75) Inventors: Michael Kunz, Muelsen (DE); Bernd Mann, Zschopau (DE); Markus Melzer, Burkhardtsdorf (DE); Juergen Meusel, Dittmannsdorf (DE)

(73) Assignee: THYSSENKRUPP PRESTA TECCENTER AG, Eschen (LI)

( * ) Notice: Subject to any disclaimer, the term of this patent is extended or adjusted under 35 U.S.C. 154(b) by 232 days.

(21) Appl. No.: 14/236,478

(22) PCT Filed: Aug. 16, 2012

(86) PCT No.: PCT/EP2012/066031
§ 371 (c)(1),
(2), (4) Date: Apr. 25, 2014

(87) PCT Pub. No.: WO2013/024140
PCT Pub. Date: Feb. 21, 2013

(65) Prior Publication Data
US 2014/0238184 A1   Aug. 28, 2014

(30) Foreign Application Priority Data
Aug. 18, 2011   (DE) .................... 10 2011 052 819

(51) Int. Cl.
*F16H 25/14*   (2006.01)
*F01L 1/047*   (2006.01)

(52) U.S. Cl.
CPC ............. *F16H 25/14* (2013.01); *F01L 1/047* (2013.01); *F01L 2001/0473* (2013.01); *Y10T 29/49293* (2015.01); *Y10T 74/2101* (2015.01)

(58) Field of Classification Search
CPC ........ F16H 25/14; F16H 25/08; F16H 25/125; F16H 21/36; F01L 1/047;
(Continued)

(56) References Cited

U.S. PATENT DOCUMENTS 4,644,912 A * 2/1987 Umeha .................. F01M 9/101
123/90.34
5,201,247 A * 4/1993 Maus ................... B21D 39/203
123/90.34
(Continued)

FOREIGN PATENT DOCUMENTS

DE       3943426 B    4/1991
DE   102007017514 B   10/2008
(Continued)

OTHER PUBLICATIONS

Machine Translation of JP 2010-196488.*

*Primary Examiner* — Richard W Ridley
*Assistant Examiner* — Brian J McGovern
(74) *Attorney, Agent, or Firm* — Andrew Wilford

(57) ABSTRACT

The invention relates to a camshaft, especially for motor vehicle engines, comprising a hollow outer shaft (1) and an inner shaft (2) arranged coaxially in the outer shaft (1) and mounted in such a way that it can rotate in relation to the outer shaft (1). Said camshaft also comprises first cams (3a) arranged on the outer shaft (1) in a rotationally fixed manner, and second cams (3b) that are arranged on the outer shaft (1) and fixed to the inner shaft (2). According to the invention, a supporting element (7) is provided on at least one of the end regions of the inner shaft (2), said supporting element projecting past the outer shaft (1) in the radial direction. An outer peripheral surface (8) of the outer shaft (1) and an associated inwardly facing surface (9) of the supporting element (7) form a radial bearing.

6 Claims, 3 Drawing Sheets

(58) Field of Classification Search
CPC ....... F01L 2001/0473; F01L 2001/0471; F01L 2001/0476; Y10T 74/2101; Y10T 74/2102; Y10T 74/2104; Y10T 74/2107; Y10T 29/49293
USPC .... 74/567, 569, 572.4, 571.1, 570.21, 570.1
See application file for complete search history.

(56) References Cited

U.S. PATENT DOCUMENTS

| | | | | |
|---|---|---|---|---|
| 5,247,737 | A * | 9/1993 | Perry | B25B 27/0035 29/464 |
| 5,664,463 | A * | 9/1997 | Amborn | B21D 53/845 123/90.6 |
| 7,588,006 | B2 | 9/2009 | Hentschel | |
| 7,610,890 | B2 * | 11/2009 | Lettmann | F01L 1/047 123/90.44 |
| 7,802,549 | B2 | 9/2010 | Schneider | |
| 8,573,169 | B2 | 11/2013 | Matsunaga | |
| 2008/0196681 | A1 * | 8/2008 | Lancefield et al. | 123/90.17 |
| 2014/0144282 | A1 * | 5/2014 | Binder et al. | 74/567 |

FOREIGN PATENT DOCUMENTS

| | | | |
|---|---|---|---|
| JP | 2010196488 B | 9/2010 | |
| WO | WO 2013001058 A1 * | 1/2013 | ............. B21D 53/84 |

\* cited by examiner

US 10,393,241 B2

CAMSHAFT, ESPECIALLY FOR MOTOR VEHICLE ENGINES

CROSS REFERENCE TO RELATED APPLICATIONS

This application is the US-national stage of PCT application PCT/EP2012/066031 filed 16 Aug. 2012 and claiming the priority of German patent application 102011052819.9 itself filed 18 Aug. 2011.

FIELD OF THE INVENTION

The invention relates to a camshaft, in particular for a motor vehicle engine, comprising a tubular outer shaft and an inner shaft coaxially mounted in the outer shaft and supported for rotation relative to the outer shaft, with first cams rotationally fixed on, and with second shafts rotatable on the outer shaft and fixed to the inner shaft.

BACKGROUND OF THE INVENTION

By adjusting the first cams relative to the second cams, the valves of a motor vehicle engine can be variably controlled. Thus, for example, the ratio between the intake timing and the exhaust timing can be modified as a function of load and rotary speed, if the intake valves on the one hand and the exhaust valves on the other hand are actuated by different groups of cams that can be adjusted relative to each other.

In order to enable a precise positioning of the cams and at the same time easy adjustability of the inner shaft relative to the outer shaft, the two shafts have to be supported in a suitable manner for rotation relative to each other. Thus, it is known in a generic camshaft having the above-described features according to DE 39 43 426 to provide sleeve bearings to support the ends of the shaft elements inside each other. This has the disadvantage that the sleeve bearings have to be fitted highly accurately in order to avoid play on the one hand and to ensure easy rotation on the other hand. The inner diameter of the outer shaft as well as the outer diameter of the inner shaft must be machined with high accuracy, but the processing of the internal surfaces of the outer shaft can be only done with a high level of processing complexity. A similar bearing concept is known from EP 1 963 625 [U.S. Pat. No. 7,802,549], where an end securing element connected to the inner shaft is supported radially on an inner surface of the outer shaft.

OBJECT OF THE INVENTION

In light of this, the object of the invention is to provide an adjustable camshaft that is less complex to manufacture.

SUMMARY OF THE INVENTION

Starting from a camshaft having the features described above, according to the invention this object is achieved by providing on at least one of the ends of the inner shaft a support element that projects radially past the outer shaft, an outer surface of the outer shaft forming a radial bearing with an inner surface of the bearing element.

According to the invention, the inner shaft and the outer shaft are supported by an outer surface of the outer shaft that can be machined during production in a comparatively simple and cost-effective manner.

According to the invention, the support element engages over a section of the outer tube, so that an annular gap formed between the inner shaft and the outer shaft is sealed there toward the outside in a labyrinth-type manner. If in this context oil for greasing purposes is fed into the annular gap between the inner shaft and the outer shaft, the support element can also contribute towards avoiding an uncontrolled escape of the oil from the annular gap.

The support element can, in the context of the invention, be integrally formed together with the base body of the inner shaft that extends in the outer shaft. The support element then forms an end enlargement of the inner shaft, and a circumferential groove for accommodating an end face of the outer pipe and for forming the inner surface can be formed in the support element.

According to a preferred embodiment of the invention, however, the support element is fabricated as a separate component and is fixed to an end of the inner shaft. To this end, bonding procedures such as welding, soldering and gluing as well as frictional connections such as shrinking, screwing as well as generating a transverse/longitudinal composite unit are suitable. In principle, also combinations of the described bonding and frictional connections may be provided.

In order to fix the support element in a predefined position of the inner shaft in a simple manner, also an interlocking support may be provided in an axial direction. Thus, the inner shaft may, for fixing the support element, include for example a shoulder in the form of a diameter reduction, which shoulder then has a fixing rim of the support element attached thereto. Of course, also other interlocking contours are conceivable, wherein for example a cylindrical fixing rim of the support element may engage in a sleeve-shaped receptacle of the inner shaft in a manner similar to a screw.

According to a preferred development of the invention, the support element is at the same time also a functional component of the camshaft. The support element may for example, in the case of a suitable structural design, also be used as a sensor wheel or a bearing element of a roller bearing on which the entire camshaft is rotatable relative to the cylinder head. If the support element is at the same time also a functional component of the camshaft, it will usually have functional surfaces and/or functional contours on its outer surface. Especially if a substantial torque is applied to the support elements as a functional component, an interlocking connection may also be provided between the support element and the inner shaft to allow a transfer of torque in the case of rotation and/or increase the torque that can be transferred.

There are various further design possibilities for the support element within the scope of the invention. Thus, the support element can for example be attached to the ends of the inner shaft and the outer shaft like a cap. Particularly preferably here, a fixing rim of the support element extends within the outer shaft, as a result of which an overall reduction of the design space may be achieved. Alternatively, it is also possible for the inner shaft to extend beyond the outer shaft out of the end of the camshaft, and in this case the fixing element is all around to the outer surface of the inner shaft.

The support element may be made from ceramic, plastic, metal, a composite material or a combination of these materials. In this context, all types of composite materials, i.e. in particular particle composite materials, fiber composite materials and multilayer composite materials may be considered. When choosing the material for the support element, all that has to be taken into account is that it has to be able to resist the operating materials, i.e. for example oils and hydraulic fluids, and also the temperatures occurring during operation, and that it has sufficient stability.

If the support element according to a preferred embodiment of the invention is manufactured as a separate component, it is also easier with such smaller components to meet accurate dimensional specifications and/or to carry out precise machining and surface-finishing operations.

The outer surface of the outer shaft and/or the inner surface of the support element that together form a radial bearing may be provided with surface finish. As surface finish, for example fine grinding, hardening, applying an antiwear coating or the like may be taken into consideration. In principle it is also possible to provide the outer tube with an additional ring made from a high-quality material in order to produce a precise outer surface, and this ring then forms part of the radial bearing as the outer surface of the outer shaft. A ring that is retrofitted, for example by shrinking, may readily be properly dimensioned or processed by other means.

According to a further aspect of the present invention, the outer shaft may have longitudinal slots at the support element, with tabs on the outer shaft formed between the longitudinal slots, extending through openings in the support element. In the context of such an embodiment, the openings in the support element have to be large enough that some angular play is left to allow rotation of the inner shaft relative to the outer shaft. In the context of such an embodiment, the cooperating surfaces of the support element and the outer shaft that form the sliding contact bearing may be provided on the tabs and/or on the region of the outer shaft that follows the tabs and is angularly closed.

Fixing the second shafts to the inner shaft may be carried out in a manner per se known using pins, bolts or any other suitable connection elements. These connection elements are passed through slots in the outer shaft in order to provide the adjustment travel needed for rotating the inner shaft and the outer shaft relative to each other.

Another object of the invention is a method of making the camshaft described. With regard to the order, there are various design possibilities, and according to a first embodiment of the method, the support element produced as a separate component is fixed to the inner shaft that is then inserted into the outer shaft and subsequently the second shaft is connected to the inner shaft through openings in the outer shaft. As an alternative, it is also possible to insert initially the inner shaft into the outer shaft, and then the second cams can be connected to the inner shaft through openings in the outer shaft, and subsequently the support element is fixed to the inner shaft. If the support element is not fixed until after the second cam has been connected to the inner shaft and the inner shaft has been centered, the risk of tilting or jamming of the support element on the outer shaft can be reduced.

In the context of the production method, the outer surface of the outer shaft forming part of the radial bearing can be machined in a simple manner before the inner shaft is mounted. It is also necessary before connecting the inner shaft and the outer shaft to each other that the first and second cams are arranged and fixed or prepositioned. To this end, it is expedient to push all of the cams onto the outer tube before the first cams are connected to the outer tube in predefined axial positions and in a predefined angular position, while the second cams still remain unfixed. If according to an alternative embodiment the first cams are formed directly from the material of the outer tube, for example by way of inner high pressure forming, the second cams have to be mounted beforehand in the desired positions, i.e. for example between two first cams. Any second cams that may be located at the shaft ends can then still be retrospectively pushed on.

As has already been described at the beginning, the support element can also contribute to avoiding any uncontrolled escape of oil. It is expedient to apply oil to the gap formed between the inner shaft and the outer shaft in order to ensure continuous easy mobility of the inner shaft relative to the outer shaft.

BRIEF DESCRIPTION OF THE DRAWING

The invention will be explained below with reference to figures that show an embodiment and in which:

FIG. 1B is a perspective view of the structure of FIG. 1a,

SPECIFIC DESCRIPTION OF THE INVENTION

Figure 1A:
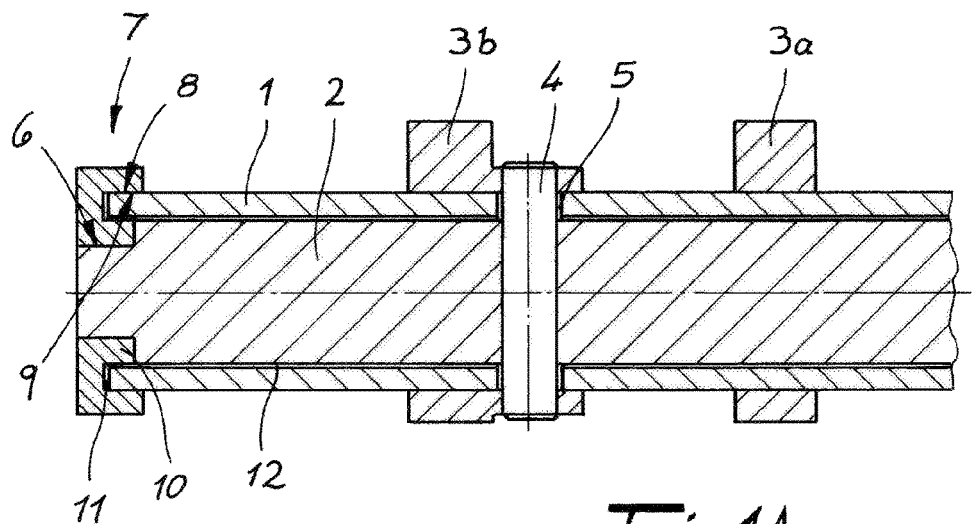
FIG. 1A is an axial section through the end of a camshaft.
Figure 1B:
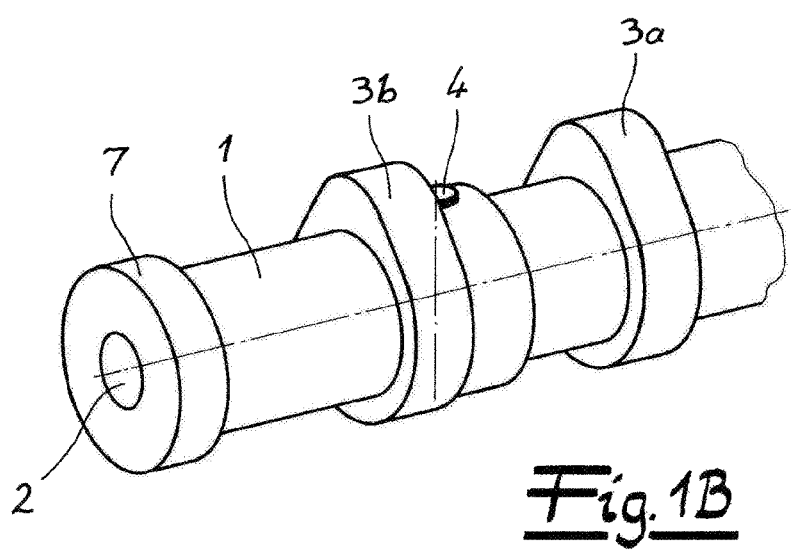

FIGS. 1A and 1B show, in longitudinal section and in perspective view, an end of a camshaft, in particular for a motor vehicle engine, having a tubular outer shaft 1 and an inner shaft 2 that extends coaxially in and is rotatable relative to the outer shaft 1. First cams 3a are rotationally fixed on the outer shaft 1. Second cams 3b are rotatably mounted on the outer shaft 1 and are rotationally connected by connection elements 4, here pins, to the inner shaft 2. In order to allow rotation of the outer shaft 1 relative to the inner shaft 2, the outer shaft 1 has angularly extending slots 5 at the connection elements 4.

According to the invention, a support element 7 is rotatably fixed on a connection surface 6 at an end of the inner shaft 2 and projects radially beyond the outer shaft 1 with an outer surface 8 of the outer shaft 1 forming, together with an complementary inwardly directed surface 9 of the support element 7, a radial bearing.

FIG. 1A shows that the support element 7 extends with a fixing rim 10 into the outer shaft 1, with an end of the outer shaft 1 being received in a circumferential groove 11 of the support element 7. FIG. 1A further shows that a radial gap 12 remains between the fixing rim 10 of the support element 7 and the outer shaft 1. Moreover, a gap is also provided between the end face of the outer shaft 1 and the floor of the groove 11 of the support element 7. By contrast, a sliding contact bearing is provided on the outer surface 8 of the outer shaft 1 as well as on the complementary surface 9 of the support element 7. These surfaces, which interact as a sliding-contact bearing, may be provided with a special surface finish, for example with a finish treatment, a hardening or a coating. In principle it would also be conceivable to provide a ring made from a special material, in order to form the outer surface 8 of the outer shaft 1 on this ring.

Figure 2:
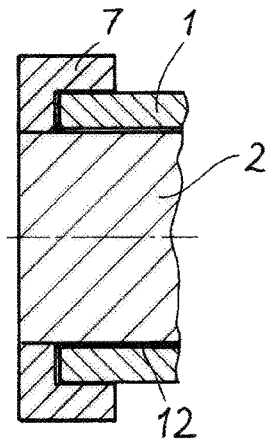
FIG. 2 is the end of a camshaft in an alternative embodiment.

FIG. 2 shows a variant of the present invention, where the support element 7 does not extend into the outer shaft with a fixing rim 10, but is fixed to a projecting end of the otherwise cylindrical inner shaft 2.

Figure 3:
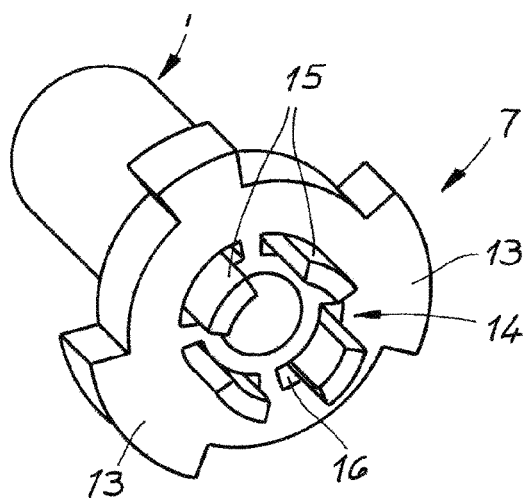
FIG. 3 is a perspective view of a further alternative embodiment.

FIG. 3 shows by way of example that the support element 7 may also be a functional element of the camshaft. In the embodiment shown, the support element 7 is also used as a sensor wheel, and to this end, shaped functional elements in the form of teeth 13 are provided on the outer surface of the support element 7. In the embodiment shown, the tubular outer shaft 1 has tabs 15 that extend s axially beyond the inner shaft 2. The outer shaft 1 has between the tabs 15 axially open slots 14 at the support element 7 so these tabs 15 on the outer shaft 1 can extend through holes 16 in the support element 7. In addition the fixing rim 10 is recessed in the inner shaft 2

Figure 4:
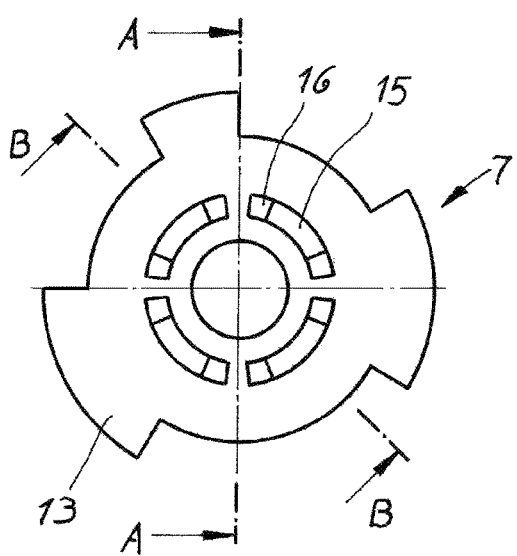
FIG. 4 is an end view of the structure of FIG. 3.
Figure 5A:
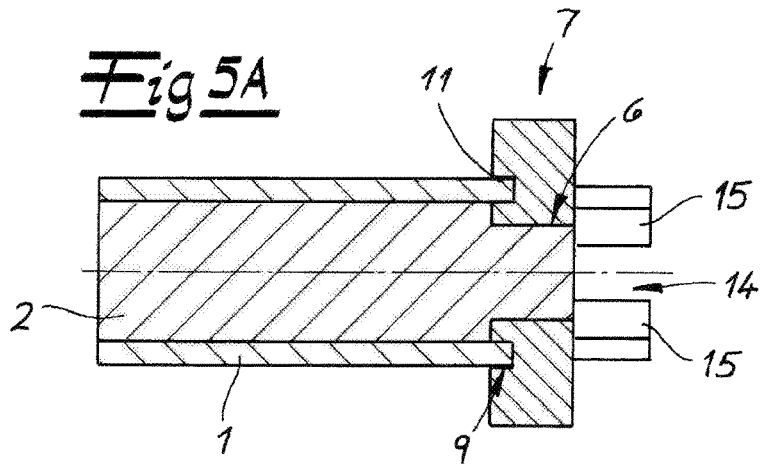
FIG. 5A is a longitudinal section taken along line A-A of FIG. 4.
Figure 5B:
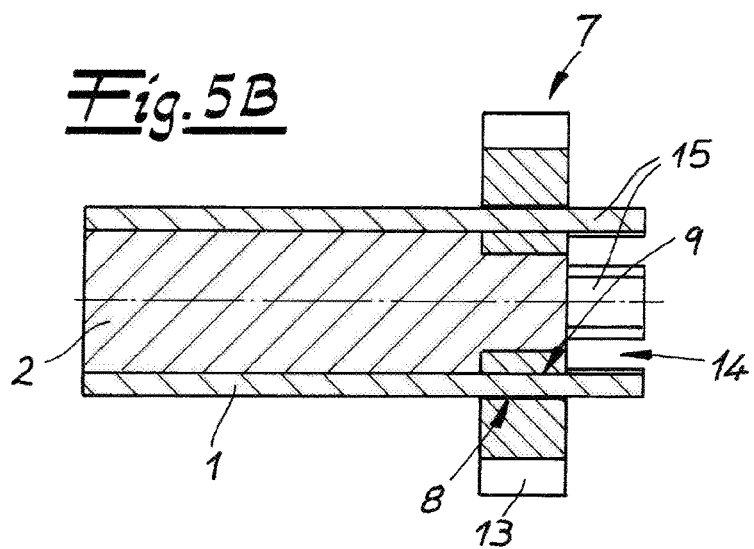
FIG. 5B is a longitudinal section taken along line B-B in FIG. 4.

FIGS. 5A and 5B are sections along respective lines A-A and B-B in FIG. 4. It can be seen here that the support element 7 is connected to the inner shaft 2 on a connection surface 6. At the groove 11, the inner surface 9 of the support element 7, which forms part of the sliding contact bearing, rests against the outer surface of the outer shaft 1 only along a comparatively short section, seen axially (FIG. 5A). At the openings 16 (FIG. 5B), however, a reliable sliding bearing is formed between the surface 9 of the support element 7 and the outer surface 8 of the outer shaft 1.

Figure 6:
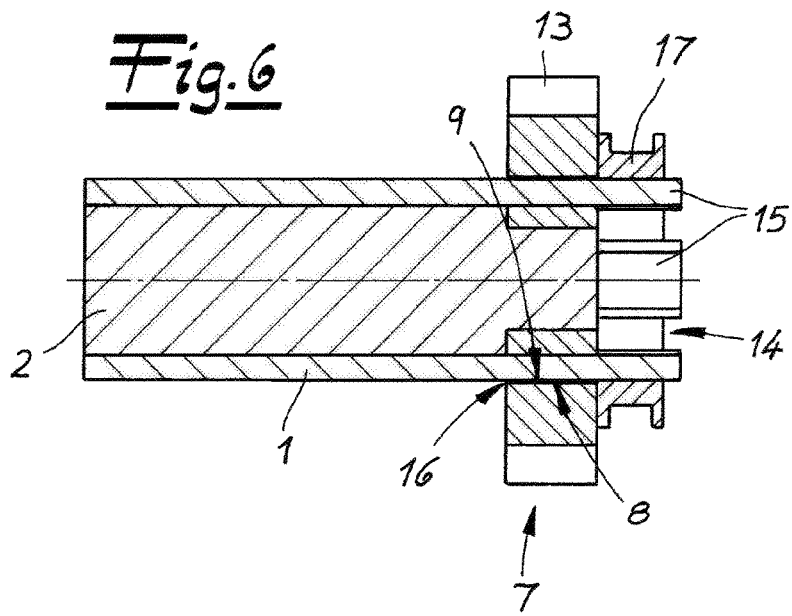
FIG. 6 shows the assembly according to FIG. 5B with an additional roller bearing ring on the outer shaft.

FIG. 6 shows an embodiment in which, in an arrangement according to FIGS. 3, 4, 5A and 5B, an additional ring 17 is axially fixed next to the support element 7 on the outer shaft 1 and forms part of a bearing for the entire camshaft.

This ring 17 not only radial supports the inner shaft 2 but also axially braces it. Thus, the support element 7 can, seen axially, be supported at one end at the groove 11 (FIG. 5A) and at the other end on an end surface of the ring 17.

The invention claimed is:

1. A camshaft for a motor vehicle engine, the camshaft comprising:
   a tubular outer shaft extending along an axis;
   an inner shaft extending coaxially in the outer shaft, having opposite ends and a diameter reduction forming an axially directed shoulder, and rotatable about the axis relative to the outer shaft;
   a first cam rotationally fixed on the outer shaft;
   a second cam rotatable on the outer shaft and fixed to the inner shaft;
   a support element on one of the ends of the inner shaft and projecting radially past the outer shaft, with an outer surface of the outer shaft forming with an inwardly directed surface of the support element a sliding-contact bearing for the inner shaft; and
   a fixing rim formed on the support element, braced axially against the shoulder of the inner shaft, and recessed and fixed in the inner shaft.

2. The camshaft defined in claim 1, wherein the fixing rim of the support element is rotationally fixed to the one end of the inner shaft by an interlocking, frictional, or bonded connection.

3. The camshaft defined in claim 1, wherein the support element is formed as a functional component of the camshaft.

4. The camshaft defined in claim 1, wherein an end of the outer shaft is received in a circumferential groove partly defined by the fixing rim of the support element and has an end face spaced axially from a floor of the groove.

5. The camshaft defined in claim 1, wherein the outer surface of the outer shaft or the inwardly directed surface of the support element that together form the radial bearing are provided with a surface finish so as to slide on each other.

6. The camshaft defined in claim 1, wherein the outer shaft has longitudinal slots at the support element and defining axially projecting tabs that extend through respective axially throughgoing openings in the support element.

* * * * *